United States Patent
Ding et al.

(10) Patent No.: US 9,055,513 B2
(45) Date of Patent: Jun. 9, 2015

(54) SCALABLE DISCOVERY IN CONTENTION-BASED PEER-TO-PEER WIRELESS NETWORKS

(71) Applicant: QUALCOMM Incorporated, San Diego, CA (US)

(72) Inventors: Gang Ding, San Diego, CA (US); Kiran Shagle Chikkappa, Bangalore (IN); Patrik Nils Lundqvist, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 13/778,025

(22) Filed: Feb. 26, 2013

(65) Prior Publication Data

US 2014/0241257 A1    Aug. 28, 2014

(51) Int. Cl.
H04J 1/16 (2006.01)
H04L 12/413 (2006.01)
H04W 48/08 (2009.01)
H04W 74/08 (2009.01)
H04W 92/18 (2009.01)

(52) U.S. Cl.
CPC .............. *H04W 48/08* (2013.01); *H04W 74/08* (2013.01); *H04W 92/18* (2013.01)

(58) Field of Classification Search
USPC .................................. 370/252, 338, 447, 465
See application file for complete search history.

(56) References Cited

U.S. PATENT DOCUMENTS

| | | | |
|---|---|---|---|
| 7,684,367 B2 | 3/2010 | Yun et al. | |
| 8,159,977 B2 | 4/2012 | Meier | |
| 8,175,621 B2 | 5/2012 | Hsu | |
| 8,243,701 B2 | 8/2012 | Palm et al. | |
| 2005/0058151 A1 | 3/2005 | Yeh | |
| 2005/0122989 A1 | 6/2005 | Ginzburg et al. | |
| 2006/0245447 A1* | 11/2006 | Chou et al. | 370/445 |
| 2008/0212477 A1* | 9/2008 | Yun et al. | 370/235 |
| 2008/0279210 A1* | 11/2008 | Naka et al. | 370/448 |

(Continued)

FOREIGN PATENT DOCUMENTS

| | | |
|---|---|---|
| EP | 1903719 A1 | 3/2008 |
| WO | 2006099519 A2 | 9/2006 |
| WO | 2011157884 A1 | 12/2011 |

OTHER PUBLICATIONS

Lee M., "Peer Aware Communications (PAC) Study Group 5 Criteria", IEEE P802.15 Working Group for Wireless Personal Area Networks (WPANs), Jan. 20, 2012, pp. 3.

(Continued)

*Primary Examiner* — Andrew Lee
(74) *Attorney, Agent, or Firm* — Arent Fox LLP

(57) ABSTRACT

Systems and methods for scalable discovery in contention-based peer-to-peer (P2P) networks are described herein. A method for managing access to a contention-based broadcast channel in a P2P wireless communication network as described herein includes obtaining one or more system timing parameters, the system timing parameters including at least a collision probability tolerance; and configuring a time structure for access to the contention-based broadcast channel using the system timing parameters, wherein the wakeup intervals are allocated between a contention period and a non-contention period and configuring the time structure comprises setting an upper-bound backoff counter value associated with the contention period as a function of at least the collision probability tolerance.

36 Claims, 11 Drawing Sheets

(56) References Cited

U.S. PATENT DOCUMENTS

| | | |
|---|---|---|
| 2009/0129404 A1* | 5/2009 | Wu et al. .................. 370/468 |
| 2009/0310620 A1* | 12/2009 | Yoshizawa et al. ........... 370/461 |
| 2010/0027490 A1* | 2/2010 | Mazet et al. ................. 370/329 |
| 2010/0254281 A1 | 10/2010 | Kim et al. |
| 2010/0278087 A1 | 11/2010 | Kawakami et al. |
| 2011/0032864 A1* | 2/2011 | Lee et al. ..................... 370/315 |
| 2011/0096711 A1 | 4/2011 | Liu et al. |
| 2012/0030358 A1 | 2/2012 | Mackenzie |
| 2012/0033634 A1 | 2/2012 | Spinar et al. |
| 2013/0203429 A1* | 8/2013 | Kneckt et al. ................ 455/450 |

OTHER PUBLICATIONS

Wi-Fi Alliance, "Wi-Fi Alliance Technical Committee P2P Task Group", Version 1.2, Dec. 14, 2011, pp. 159.

International Search Report and Written Opinion—PCT/US2014/016975—ISA/EPO—Jun. 12, 2014.

\* cited by examiner

SCALABLE DISCOVERY IN CONTENTION-BASED PEER-TO-PEER WIRELESS NETWORKS

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Wireless communication devices are configured for operation within one or more wireless communication networks, which may differ according to radio access technology, network architecture, or other properties. For instance, wireless communication networks include centralized networks, in which wireless communication devices communicate through central entities such as base stations or access points, as well as peer-to-peer networks, in which wireless communication devices communicate directly among each other without a central network element. In order to establish links for communication within a peer-to-peer wireless network, participating devices identify and initialize communication with each other through a process referred to as device discovery.

SUMMARY

An example of a method for managing access to a contention-based broadcast channel in a peer-to-peer (P2P) wireless communication network according to the disclosure includes obtaining one or more system timing parameters, the system timing parameters including at least a collision probability tolerance; and configuring a time structure for access to the contention-based broadcast channel using the system timing parameters. The wakeup intervals are allocated between a contention period and a non-contention period, and configuring the time structure includes setting an upper-bound backoff counter value associated with the contention period as a function of at least the collision probability tolerance.

Implementations of the method may include one or more of the following features. In response to a current time being in the contention period, entering an active mode to transmit one or more broadcast messages over the contention-based broadcast channel and to attempt to receive one or more broadcast messages over the contention-based broadcast channel. Transmitting one or more discovery packets (DPs) over the contention-based broadcast channel and attempting to receive one or more DPs over the contention-based broadcast channel. Embedding information relating to the time structure in the one or more DPs. Setting the upper-bound backoff counter value as a multiplicative inverse of the collision probability tolerance. Obtaining an upper-bound discovery time associated with the network; defining a range for the upper-bound backoff counter value, the range having a lower bound defined by a multiplicative inverse of the collision probability tolerance and an upper bound defined as a function of the upper-bound discovery time; and selecting the upper-bound backoff counter value from a set of values falling within the range.

Implementations of the method may additionally or alternatively include one or more of the following features. Configuring the time structure as a first time structure; receiving information relating to a second time structure for access to the contention-based broadcast channel utilized by a peer device in the network; and adjusting the first time structure based on the information. Receiving an indicator of an upper-bound backoff counter value of the second time structure. Adjusting the upper-bound backoff counter value of the first time structure if the upper-bound backoff counter value of the first time structure differs from the upper-bound backoff counter value of the second time structure. Setting the upper-bound backoff counter value of the first time structure to be equal to the upper-bound backoff counter value of the second time structure if the upper-bound backoff counter value of the second time structure is greater than the upper-bound backoff counter value of the first time structure. Transmitting information relating to the time structure to one or more peer devices in the network, where the information comprises an indicator of the upper-bound backoff counter value. In response to a current time being in the non-contention period, performing one or more of entering a sleep mode or communicating with one or more peer devices in the network based on broadcast messages received during the contention period.

An example of an apparatus for access management in a contention-based P2P wireless communication network according to the disclosure includes a timing regulator configured to obtain one or more system timing parameters, the system timing parameters including at least a collision probability tolerance, and to initialize a time structure for access to the contention-based broadcast channel using the system timing parameters, where the wakeup intervals are allocated between a contention period and a non-contention period. The apparatus additionally includes a contention window control module communicatively coupled to the timing regulator and configured to set an upper-bound backoff counter value associated with the contention period as a function of at least the collision probability tolerance.

Implementations of the apparatus may include one or more of the following features. A transmission scheduler communicatively coupled to the timing regulator and the contention window control module and configured to enter an active mode for transmission or attempted detection of one or more DPs over the contention-based broadcast channel in response to a current time being in a contention period. The transmission scheduler is further configured to embed information relating to the time structure in one or more transmitted DPs. The contention window control module is further configured to set the upper-bound backoff counter value as a multiplicative inverse of the collision probability tolerance. The timing regulator is further configured to obtain an upper-bound discovery time associated with the network; and the contention window control module is further configured to define a range for the upper-bound backoff counter value, the range having a lower bound defined by a multiplicative inverse of the collision probability tolerance and an upper bound defined as a function of the upper-bound discovery time, and to select the upper-bound backoff counter value from a set of values falling within the range.

Implementations of the apparatus may additionally or alternatively include one or more of the following features. The time structure managed by the timing regulator includes a first time structure, the upper-bound backoff counter value set by the contention window control module includes a first upper-bound backoff counter value, and the apparatus further includes a contention window adjustment module communicatively coupled to the contention window control module and the timing regulator and configured to obtain information relating to a second time structure for access to the contention-based broadcast channel utilized by a peer device in the network and to adjust the first time structure based on the information. The information obtained from the peer devices includes an indicator of a second upper-bound backoff counter value associated with the second time structure. The contention window adjustment module is further configured to adjust the first upper-bound backoff counter value if the first upper-bound backoff counter value and second upper-bound backoff counter value differ. The contention window adjustment module is further configured to set the first upper-bound backoff counter value to be equal to the second upper-bound backoff counter value if the second upper-bound backoff counter value is greater than the first upper-bound backoff counter value. The transmission scheduler is further configured to select, in response to a current time being in the non-contention period, an operation from among entering a sleep mode or communicating with one or more peer devices in the network based on broadcast messages received during the contention period.

An example of an apparatus for managing access to a contention-based broadcast channel in a P2P wireless communication network according to the disclosure includes means for obtaining one or more system timing parameters, the system timing parameters including at least a collision probability tolerance; means for configuring a time structure for access to the contention-based broadcast channel using the system timing parameters, where the wakeup intervals are allocated between a contention period and a non-contention period; and means for setting an upper-bound backoff counter value associated with the contention period as a function of at least the collision probability tolerance.

Implementations of the apparatus may include one or more of the following features. Means for setting the upper-bound backoff counter value as a multiplicative inverse of the collision probability tolerance. Means for obtaining an upper-bound discovery time associated with the network; means for defining a range for the upper-bound backoff counter value, the range having a lower bound defined by a multiplicative inverse of the collision probability tolerance and an upper bound defined as a function of the upper-bound discovery time; and means for selecting the upper-bound backoff counter value from a set of values falling within the range. The time structure includes a first time structure, the upper-bound backoff counter value includes a first upper-bound backoff counter value, and the apparatus further includes means for obtaining information relating to a second time structure for access to the contention-based broadcast channel utilized by a peer device in the network, the information including an indicator of a second upper-bound backoff counter value associated with the second time structure; and means for adjusting the first time structure based on the information. Means for adjusting the first upper-bound backoff counter value if the first upper-bound backoff counter value and second upper-bound backoff counter value differ. Means for setting the first upper-bound backoff counter value to be equal to the second upper-bound backoff counter value if the second upper-bound backoff counter value is greater than the first upper-bound backoff counter value. Means for transmitting information relating to the time upper-bound backoff counter value to one or more peer devices in the network.

An example of a computer program product according to the disclosure resides on a processor-executable computer storage medium and includes processor-executable instructions configured to cause a processor to obtain one or more timing parameters for a wireless communication network, the system timing parameters including at least a collision probability tolerance; and configure a time structure for access to a contention-based broadcast channel associated with the network using the system timing parameters. The wakeup intervals are allocated between a contention period and a non-contention period, and configuring the time structure includes setting an upper-bound backoff counter value associated with the contention period as a function of at least the collision probability tolerance.

Implementations of the computer program product may include one or more of the following features. Instructions configured to cause the processor to set the upper-bound backoff counter value as a multiplicative inverse of the collision probability tolerance. Instructions configured to cause the processor to obtain an upper-bound discovery time associated with the network; define a range for the upper-bound backoff counter value, the range having a lower bound defined by a multiplicative inverse of the collision probability tolerance and an upper bound defined as a function of the upper-bound discovery time; and select the upper-bound backoff counter value from a set of values falling within the range. Instructions for causing the processor to configure the time structure as a first time structure; receive information relating to a second time structure for access to the contention-based broadcast channel utilized by a peer device in the network, the information comprising an indicator of an upper-bound backoff counter value of the second time structure; and adjust the first time structure based on the information. Instructions configured to cause the processor to adjust the upper-bound backoff counter value of the first time structure if the upper-bound backoff counter value of the first time structure differs from the upper-bound backoff counter value of the second time structure. Instructions configured to cause the processor to set the upper-bound backoff counter value of the first time structure to be equal to the upper-bound backoff counter value of the second time structure if the upper-bound backoff counter value of the second time structure is greater than the upper-bound backoff counter value of the first time structure. Instructions configured to cause the processor to transmit information relating to the time structure to one or more peer devices in the network, where the information includes an indicator of the upper-bound backoff counter value.

Items and/or techniques described herein may provide one or more of the following capabilities, as well as other capabilities not mentioned. Discovery protocols described herein are distributed, enabling devices to discover their neighboring devices without the aid of a central controller such as a base station, access point or master. Additionally, device discovery as described herein is scalable, e.g., with complexity of discovery increasing as a polynomial function of the number of devices. Further, the discovery protocols described herein provide increased power efficiency and can be feasibly implemented as an extension of existing wireless systems. Other capabilities may be provided and not every implementation according to the disclosure must provide any, let alone all, of the capabilities discussed. It may also be possible for an effect noted above to be achieved by means other than that noted, and a noted item/technique may not necessarily yield the noted effect.

DETAILED DESCRIPTION

Figure 1:
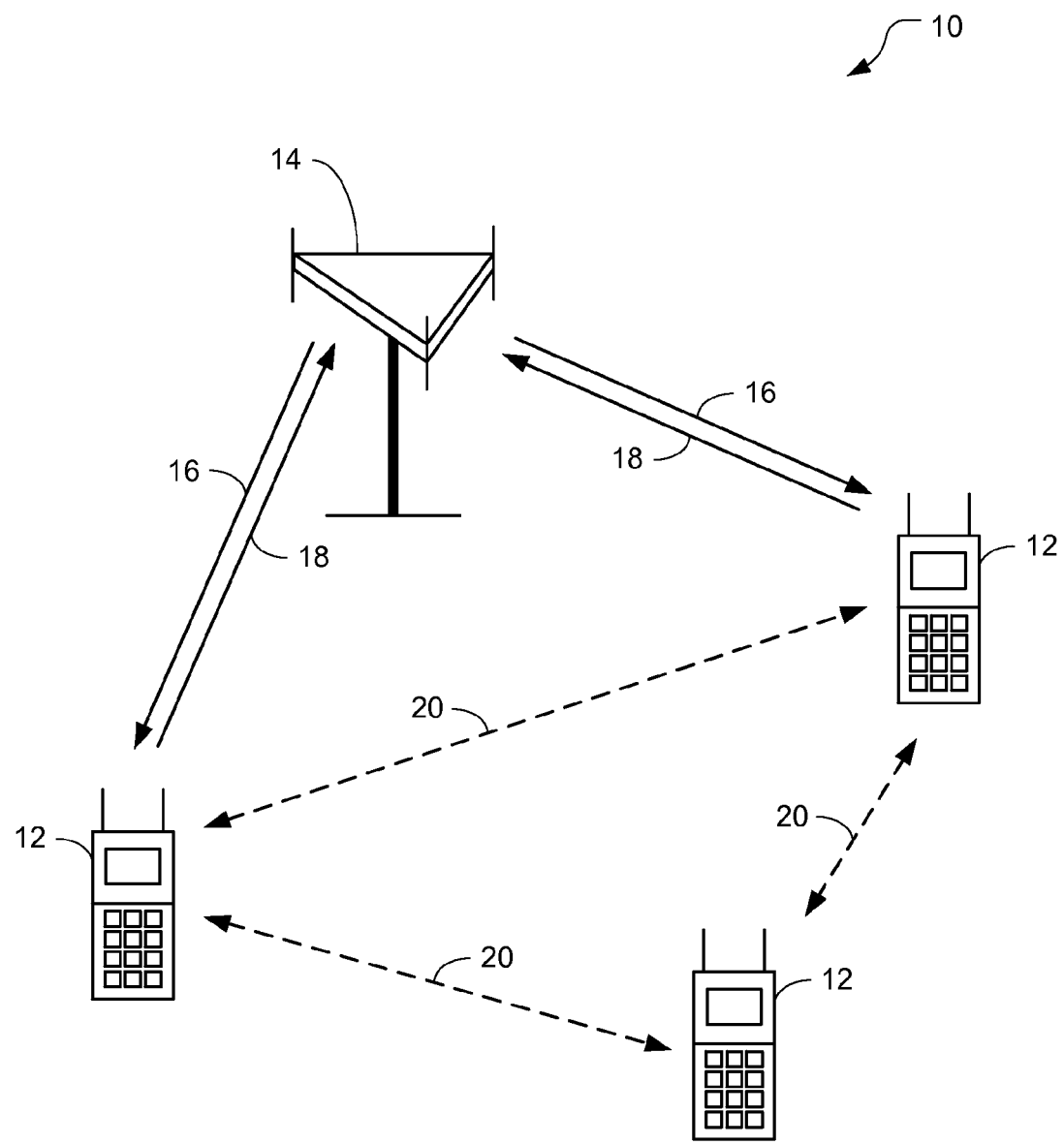
FIG. 1 is a schematic diagram of a wireless telecommunication system.

Described herein are systems and methods for device discovery in a peer-to-peer (P2P) wireless communication network. The systems and methods described herein can operate via one or more mobile devices operating in a wireless communication system. Referring to FIG. 1, a wireless communication system 10 includes a variety of wireless communication devices, referred to herein as mobile devices 12. Wireless communication devices can include, but are not limited to, personal digital assistants (PDAs), smartphones, computing devices such as laptops, desktops or tablet computers, automobile computing systems, etc., whether presently existing or developed in the future.

The system 10 may include one or more centralized entities, such as a base transceiver station (BTS) 14, that facilitate communication between mobile devices 12 and/or other networks or internetworks, such as the Internet, that are associated with the system 10. The BTS 14 communicates with mobile devices 12 on a forward link (or downlink) 16 and a reverse link (or uplink) 18. The forward link 16 refers to communication from the BTS 14 to a mobile device 12, while the reverse link 18 refers to communication from a mobile device 12 to the BTS 14.

The BTS 14 can wirelessly communicate with the mobile devices 12 in the system 10 via antennas. A BTS 14 may also be referred to as a base station, an access point, an access node (AN), a Node B, an evolved Node B (eNB), etc. The BTS 14 may provide communication coverage for a geographic area in which the BTS 14 is situated, such as a cell and/or a sector of a cell. In the case of a sectorized cell, the cell is partitioned into respective sectors as a function of the base station antennas.

The BTS 14 may be a macro base station, and/or a base station of a different type, such as a macro, pico, and/or femto base station, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

As further shown in FIG. 1, some or all mobile devices 12 in the system 10 are configured to communicate directly with each other without intervention of the BTS 14 via a P2P network architecture. In a P2P wireless network, mobile devices 12 communicate with each other by establishing P2P communication links 20 between participating mobile devices 12 and subsequently communicating using these links 20. A mobile device 12 communicating using P2P communication links 20 need not be associated with a BTS 14 or other centralized network entity; however, a mobile device 12 may nonetheless establish and/or utilize a connection to a BTS 14 and/or other entities in order to communicate over other networks or internetworks in addition to the P2P network.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

Figure 2:
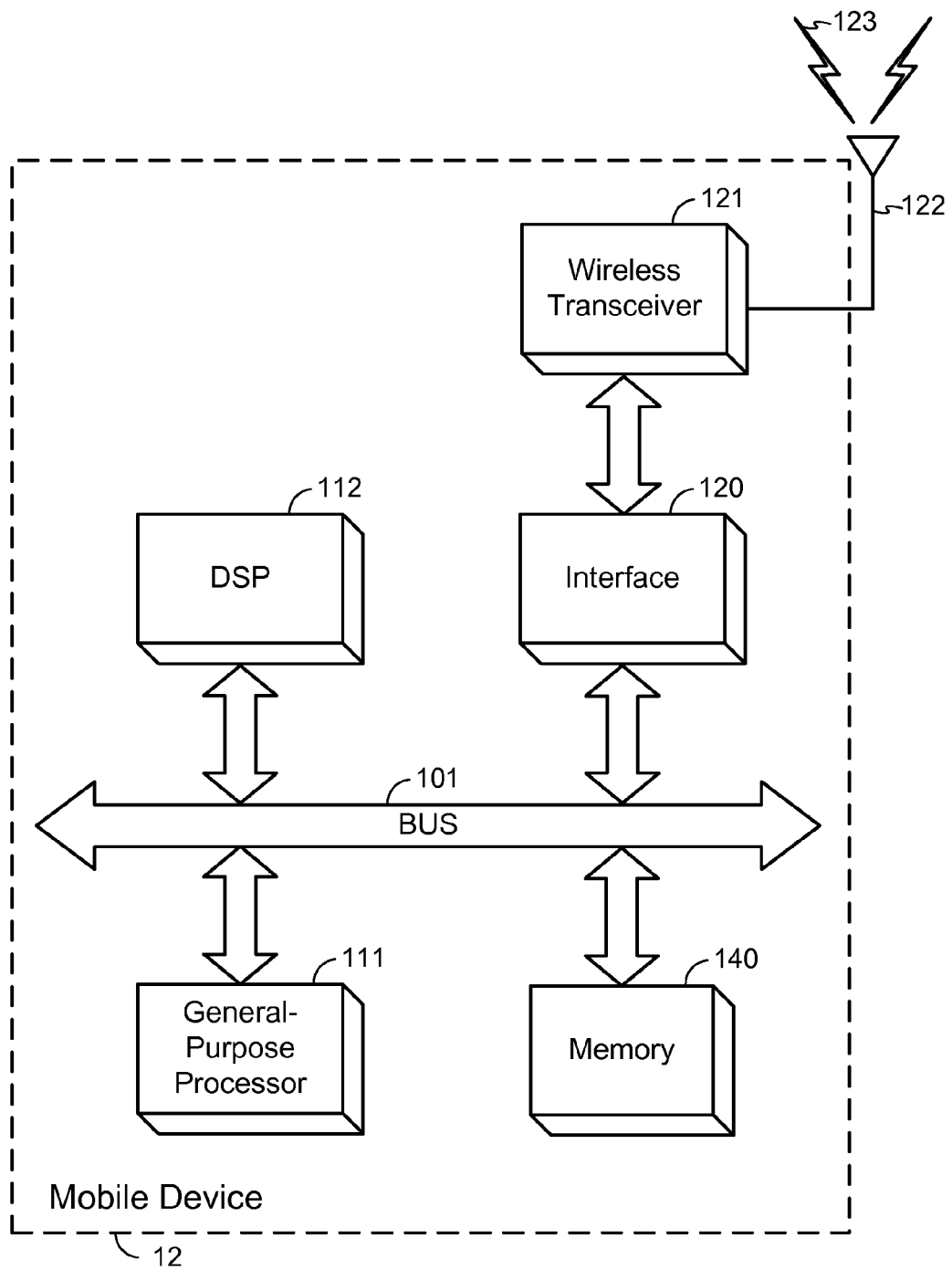
FIG. 2 is a block diagram of components of a mobile station shown in FIG. 1.

Referring next to FIG. 2, an example one of the mobile devices 12 includes a wireless transceiver 121 that sends and receives wireless signals 123 via a wireless antenna 122 over a P2P communication network or other wireless network. The transceiver 121 is connected to a bus 101 by a wireless transceiver bus interface 120. While shown as distinct components in FIG. 2, the wireless transceiver bus interface 120 may also be a part of the wireless transceiver 121. Here, the mobile device 12 is illustrated as having a single wireless transceiver 121. However, a mobile device 12 can alternatively have multiple wireless transceivers 121 and wireless antennas 122 to support multiple communication standards such as Wi-Fi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 2, more than one of any of these components could be used by the mobile device 12. The general purpose processor 111, DSP 112 and memory 140 are connected to the bus 101.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software (programming code, instructions, etc.) configured to cause the processor 111 and/or DSP 112 to perform the functions described. Alternatively, one or more functions of the mobile device 12 may be performed in whole or in part in hardware.

A P2P wireless network can be utilized for a variety of applications. For instance, P2P location techniques can be used to enable position estimation without a base station and/or other back-end devices, thereby enabling each participating device in the network to estimate its location in a self-contained manner. Devices within a P2P network identify their position by communicating with neighboring devices within the network. As the locations of devices within the network may change over time (i.e., due to the devices being moved), each device can also utilize P2P communication to propagate information to devices that are located farther away than the communication range of the device.

In contrast to centralized networks in which a base station, server, or other central network entity manages communication between devices in the network, devices in a P2P network (referred to as "peer devices" or simply "peers") operate without a central controller and have approximately equal capabilities. Thus, before communication between peer devices can occur, the peer devices must initiate a discovery protocol to detect and establish communication links with each other.

Described herein are techniques for conducting device discovery in a P2P wireless network. The techniques described herein are highly scalable, e.g., the techniques are practicable for a P2P network including hundreds, or even thousands, of devices. Further, the techniques described herein are capable of practical implementation into existing systems, such as P2P Wi-Fi systems (e.g., Wi-Fi Direct, Wi-Fi Social, etc.) or the like, without infeasible modification. While specific references are made in the following description to Wi-Fi based P2P networks and/or other specific network implementations, the techniques described herein are not intended to be limited to any specific network architecture(s), and any network architecture(s) could be used unless explicitly stated otherwise.

The protocols described herein avoid the use of licensed and/or proprietary radio spectrum for device discovery, which are generally undesirable from the view of network operators for P2P applications that do not utilize a central controller. Additionally, the discovery protocols described herein reduce inefficiency related to overloading on the industrial, scientific and medical (ISM) band, for which the probability of overloading increases with the number of devices in the network. In particular, the techniques described herein allow device discovery to be conducted using resources that are pre-allocated to a P2P network, thereby facilitating low-cost and low-complexity implementation of the techniques into existing networks. Alternatively, resources for discovery may be allocated on the ISM band by implementing one or more safeguards against overloading as described below. As social Wi-Fi networks and other P2P wireless network technologies increase in use and popularity, device discovery techniques with increased efficiency and scalability, such as those described herein, will be increasingly desirable.

Various solutions currently exist for device discovery in P2P wireless networks; however, the techniques described herein provide improvement in one or more of distributed control, scalability, power efficiency and feasibility over each of the existing solutions. For instance, the Wi-Fi Direct standard developed by the Wi-Fi Alliance provides for discovery that is power efficient but not readily scalable for large numbers of devices. Other solutions for P2P device discovery, such as Wi-Fi Social and IEEE 802.15.8, are in early developmental phases and are not currently implementable. WiMedia is a Wireless Personal Area Network (WPAN) communication standard that enables P2P device discovery; however, device discovery under WiMedia provides low power efficiency and scalability over approximately 100 devices. Low-energy Bluetooth, another WPAN communications standard, provides partially distributed P2P device discovery that utilizes dedicated discovery channels. Further, in each of the above standards, device discovery completes in a timeframe on the order of several seconds. This is a higher discovery time in comparison to the techniques described herein, which typically complete in under approximately 500 ms.

Figure 3:
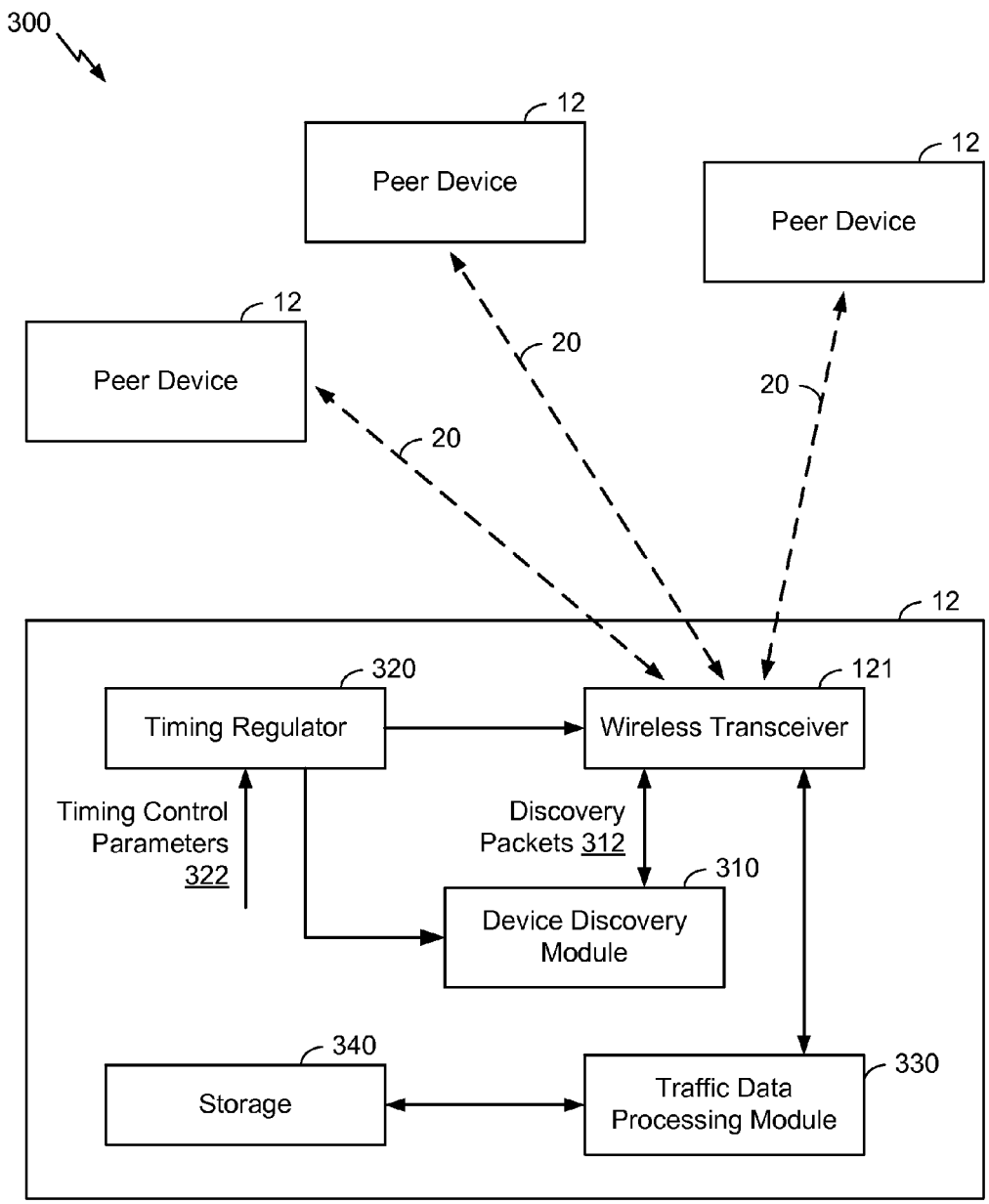
FIG. 3 is a block diagram of a system for managing access to a contention-based channel in a peer-to-peer wireless network.

Referring to FIG. 3, a system 300 that facilitates device discovery in a P2P wireless communication network includes multiple mobile devices 12, here also referred to as peer devices, which communicate with each other via P2P communication links 20 as generally described above. A mobile device 12 conducts and regulates device discovery using a wireless transceiver 121 and modules 310, 320, 330, 340, as shown in FIG. 3 and described below. While only one mobile device is illustrated with a wireless transceiver 121 and modules 310, 320, 330, 340 for simplicity of illustration, any of the mobile devices 12 illustrated in FIG. 3 may include or otherwise be configured with at least a portion of the illustrated and below described components.

As described above, the mobile device 12 conducts P2P communication with other mobile devices 12 in the system 300 over P2P communication links 20. In order to detect other mobile devices 12 within range and establish associated P2P links 20, a mobile device 12 conducts a discovery process as described herein. To conduct device discovery, a mobile device 12 utilizes a device discovery module 310 to generate and process outgoing discovery packets 312 and to process incoming discovery packets 312. Incoming discovery packets 312 are received, and outgoing discovery packets 312 are sent, via a wireless transceiver 121 as described with respect to FIG. 2.

Once communication links (e.g., P2P links 20 or other communication links) are established between a mobile device 12 and other devices in the system 300, the mobile device 12 may transmit and/or receive data to one or more detected devices using a traffic data processing module 330, storage 340, and the wireless transmitter 121. In particular, incoming data are received by the wireless transceiver 121, processed by the traffic data processing module 330, and then optionally stored at the storage 340 and/or otherwise processed by the mobile device 12. Similarly, outgoing data are retrieved from the storage 340 and/or another data source and processed by the traffic data processing module 330 for transmission via the wireless transceiver 121. The traffic data processing module 330 may be implemented wholly or in part by the general-purpose processor 111 and/or other elements of the mobile device 12, and the storage 340 may be, or include, a memory 140 or other suitable non-transitory storage medium.

The system 300 shown in FIG. 3 operates in some instances as a contention-based wireless network, in which devices within the system 300 communicate over a common wireless medium. To avoid collisions between mobile devices 12 in the system 300 during this process, the mobile devices utilize a timing regulator 320 to control device discovery according to a time structure. The time structure is, in turn, defined by one or more timing control parameters 322, which are described in further detail below.

Figure 4:
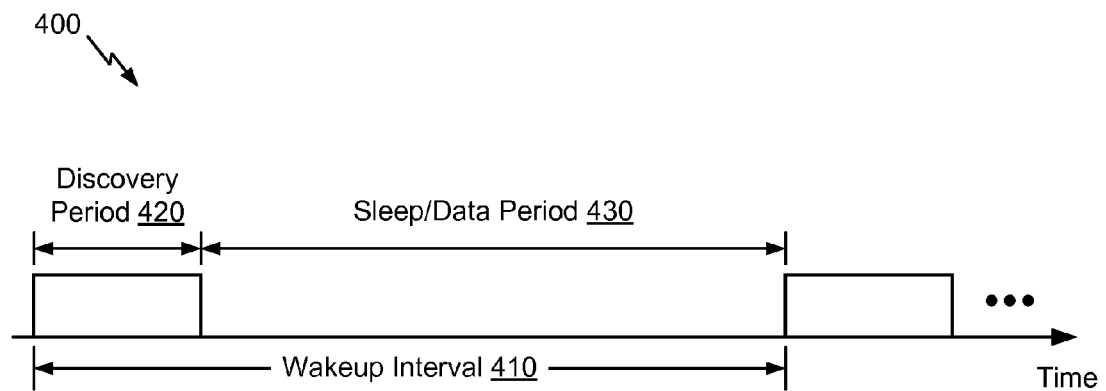
FIGS. 4-5 are illustrative views of a timing structure utilized by the system shown in FIG. 3.
Figure 5:
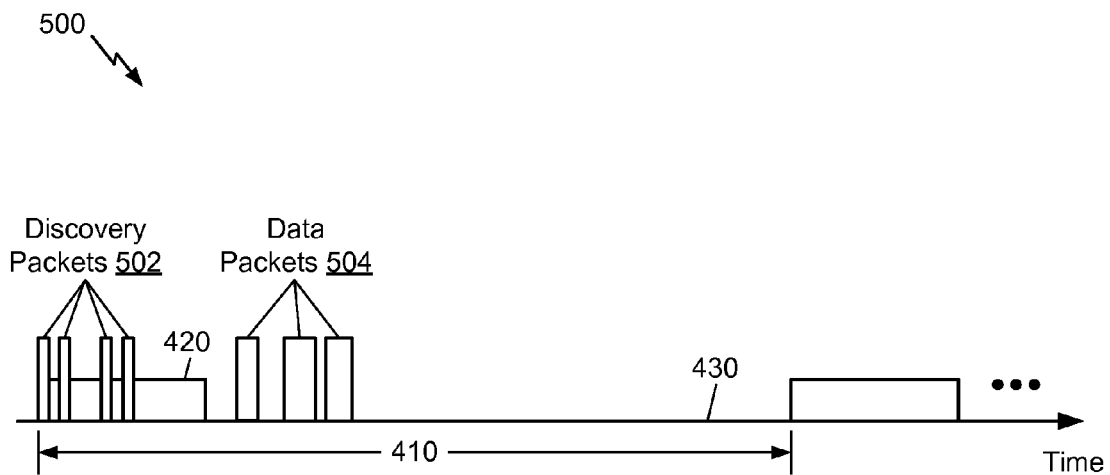

Diagram 400 in FIG. 4 illustrates a timing structure utilized by the timing regulator 320. The timing structure is defined into periods referred to as wakeup intervals 410. A wakeup interval 410 is further divided into smaller intervals referred to as a discovery period 420 and a sleep/data period 430. As further shown in diagram 500 in FIG. 5, each device becomes active (i.e., enters an awake state from a sleep state) in the discovery period 420 to transmit a discovery packet (DP) 502 and listen for DPs 502 from other devices. In the sleep/data period 430, devices either communicate data packets 504 according to received DPs 502 during the discovery period 420 or deactivate (i.e., re-enter the sleep state from the awake state). A device may also deactivate during the sleep/data period 430 upon the conclusion of data packets 504 transmitted or received by the device, as indicated within the packet(s) themselves or by other means.

Here, the wakeup interval 410 is constructed such that the discovery period 420 has a relatively short duration compared to the sleep/data period 430. For example, the discovery period 420 may be structured to occupy an amount of time that is no more than approximately 1/20 the amount of time occupied by the sleep/data period (e.g., a discovery period 420 of approximately 1 second for a sleep/data 430 period of approximately 20 seconds). Other configurations are possible, and in some cases a ratio of approximately 1/600 (e.g., based on a 100 ms discovery period 420 and 1 minute sleep/data period 430) or smaller between discovery period time and sleep/data period time may be used depending on the properties of the system in which the techniques herein are employed. Other configurations are possible, and the discovery period 420 and sleep/data period 430 could have any lengths, including lengths above or below these enumerated values.

As noted above, the timing regulator 320 and corresponding timing control parameters 322 shown in system 300 are utilized to manage access to a contention-based channel for device discovery and mitigate collisions on the channel. The timing regulator 320 operates as described below to provide a balance between collisions between devices 12 conducting discovery and consumption of power and/or other resources associated with the discovery period 420 and facilitates improved efficiency for transmission of discovery packets 502 in the discovery region 420.

Figure 6:
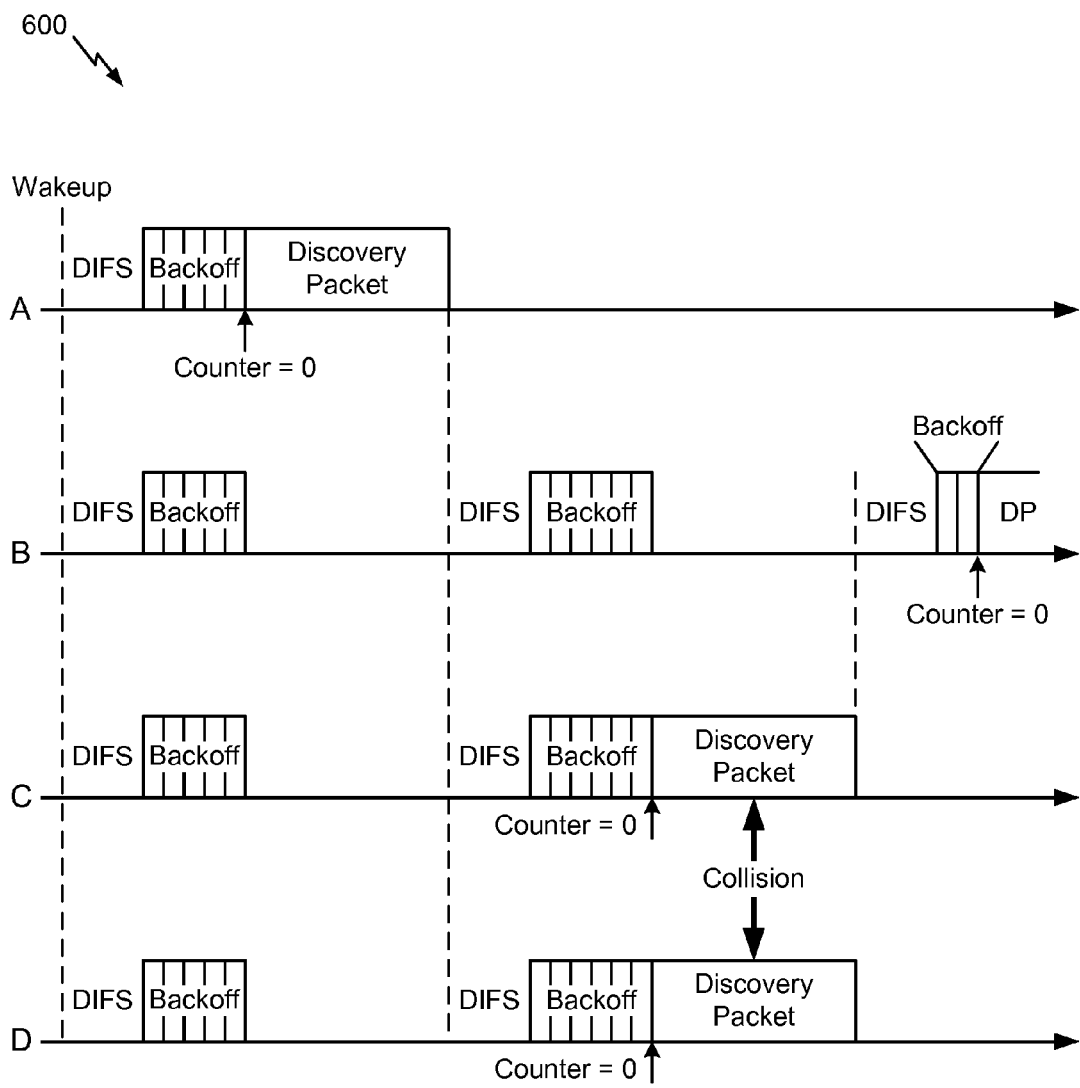
FIG. 6 is an illustrative view of operations conducted over a contention-based channel in a wireless communication system.

Diagram 600 in FIG. 6 illustrates a transmission scheme for discovery packets over a contention-based channel. Generally, devices in a contention-based channel access scheme operate in a contention window in time, which is divided into a set number of units referred to as slots. Each device that is to transmit packets on the channel is assigned a random backoff counter from 1 to CW, where CW is the total number of slots in the contention window. Upon reaching the slot corresponding to a device's assigned offset, the device begins transmitting its discovery packet. In response, all other devices in the system detect that the channel is busy and pause their backoff until the channel returns to idle. If two devices have the same offset, they will send their packets at the same time, causing a collision.

Conventionally, devices set their initial contention window size to a relatively small value (e.g., less than or equal to 15) initially. Upon wakeup or detecting an idle channel, each device waits for a DCF (Distributed Coordination Function) Interframe Space (DIFS) interval and then begins decrementing its backoff counter. Here, device A has the smallest backoff counter (5). Once the backoff counter of device A reaches zero, device A transmits its discovery packet. In response, devices B, C and D detect that the channel is busy and pause their backoff counters until the channel is determined to be idle again.

Next, diagram 600 shows that devices C and D have selected the same backoff counter (11). Thus, the backoff counters of C and D reach zero at the same time and their discovery packets collide. Finally, Device B has the largest backoff counter (13) and therefore sends its discovery packet last.

Conventionally, contention-based channel access is designed for unicast transmissions where a first device transmits a packet to a second device and the second device responds to the packet with an acknowledgment. In this case, a collision is assumed when an acknowledgment to a packet is not received. Based on this system, the contention window begins at a small number of slots (e.g., 15 slots) and increases as collisions are detected. In contrast, discovery packets associated with a P2P network are communicated in broadcast transmissions without acknowledgments. As a result, devices in the system assume that all packets are sent and received correctly and do not detect or adjust for collisions between discovery packets, such as the collision between the discovery packets of C and D as shown in diagram 600.

As shown by diagram 600, a small initial contention window introduces a large chance of collisions into a contention-based device discovery process. The contention window may be enlarged upon detection of collisions only when acknowledgments are communicated. Consequentially, since discovery packets as described above are transmitted via broadcast without acknowledgement, the transmitter is unable to obtain feedback to adjust its contention window.

Thus, the timing regulator 320 is configured to mitigate collisions of broadcast transmissions within a P2P wireless network by selecting an appropriate initial contention window size. Here, the size of the contention window is chosen as a function of a tolerable average collision probability. For instance, the size of the contention window may be chosen as a multiplicative inverse of the tolerable collision probability (e.g., 1000 slots for a desired probability of 0.1%). An explanation for this value is as follows. Assuming each device selects a backoff counter size between 1 and a maximum contention window size CW (or a backoff counter size n conforming to 0>n≥CW for non-integer values of n) uniformly and independently, the probability of two devices selecting the same backoff counter size, denoted as P(X=Y), is given as follows:

$$P(X = Y) = \sum_{i=1}^{CW} P(X = Y \mid Y = i) \times P(Y = i)$$
$$= \sum_{i=1}^{CW} P(X = i) \times P(Y = i)$$
$$= 1/CW.$$

If the timing regulator 320 is configured to keep the probability of collisions between two given discovery packets below an upper-bound or tolerable collision probability p, i.e., 1/CW≤p, solving for CW results in CW≤1/p. In other words, here CW has a lower-bound size equal to of the multiplicative inverse of the tolerable average collision probability for the channel of interest. Based on this lower-bound contention window size, the maximum discovery time is less than or equal to n(DIFS+$T_{dp}$)+CW, where n is the number of devices in the system, DIFS is the DIFS interval length for the system, and $T_{dp}$ is the transmission time of one discovery packet. Thus, the maximum discovery time scales with the number of devices at time complexity O(n). Here the maximum discovery time is defined as the longest time it takes for all n devices to complete transmitting their own discovery packets.

By setting an appropriate initial size CW for the contention window, the timing regulator 320 contributes to realizing a system-wide collision probability that is no greater than a specified upper bound collision probability without relying upon adjustments to the contention window that are associated with unicast transmission schemes. Other factors, such as the number of devices in the network, the density of devices in the network per unit area, etc., could also be used in determining the initial contention window size.

By using the techniques described herein, the timing regulator 320 utilizes a large initial contention window for the transmission of discovery control packets. Although discovery packets are broadcast and sent only once from each device, the timing regulator 320 provides increased prevention of collisions among large amounts of devices in a network. The contention window size is determined based on an expected loss rate, a collision tolerance, or other factors, thereby trading overall discovery time for reduced packet loss.

The techniques described herein are distributed and usable in a pure P2P system where each device has similar functionality. Further, as the maximum discovery time is a polynomial function of the number of devices, the techniques described herein provide increased scalability. The shorter discovery time realized via the techniques herein additionally enables a short discovery period and a low duty cycle wakeup schedule, increasing the power efficiency of the system. The techniques described herein are also feasibly implementable into CSMA/CA (Carrier Sense Multiple Access with Collision Avoidance) systems and/or other systems.

While the techniques described herein relate to the transmission of discovery packets for device discovery within a P2P wireless network, other implementations are possible. For instance, the techniques herein could be utilized for any contention-based access scheme utilizing broadcast transmission. Further, the techniques described herein could be applied in the context of any P2P or decentralized network architecture, whether currently existing or existing in the future.

Figure 7:
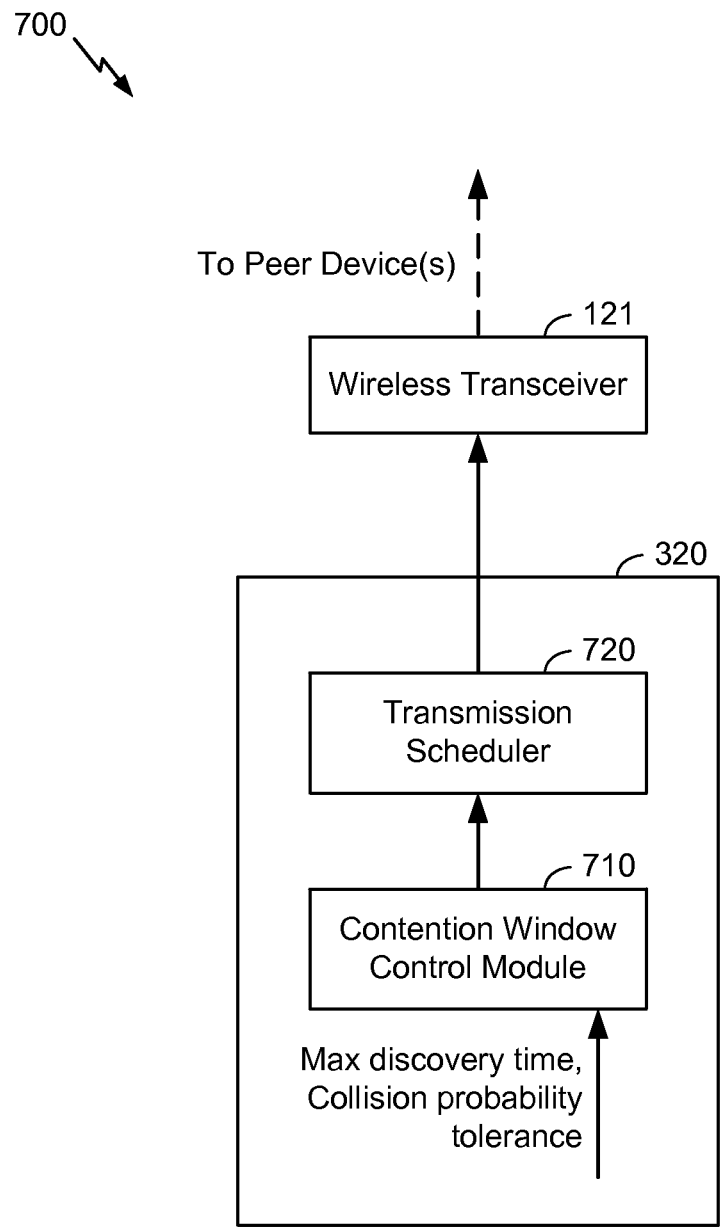
FIG. 7 is a block diagram of a system for scheduling and transmitting data packets according to a temporal contention window as shown in FIGS. 4-5.

The operation of the timing regulator 320 is shown in further detail by system 700 in FIG. 7. The timing regulator 320 shown in system 700 includes a contention window control module 710 and a transmission scheduler 720. The contention window control module 710 sets a contention window length that operates as described above based on system parameters such as a maximum discovery time, a collision probability tolerance, or other parameters that impact the discovery performance of the system 700. Once the contention window length is set, it is provided to a transmission scheduler 720 for use in transmitting discovery packets and/or other information on a contention-based channel via a wireless transceiver 121. The transmission scheduler 720 initializes a backoff counter with a selected backoff value that is no greater than the contention window size. Using this backoff counter, discovery transmissions are conducted in a manner similar to that illustrated by FIG. 6.

As discussed above, the contention window control module 710 can set an initial contention window size as a function of a collision probability tolerance p. The parameter p is obtained by the contention window control module 710 by upper layer entities, other devices in the system, user-defined parameters, and/or by other means. The parameter p may also be a preconfigured value at the associated device. The parameter p may also be a system-wide parameter such that each device in the system obtains the same value. Based on this parameter and/or other criteria as noted above, the contention window control module 710 sets the contention window size and provides this information to the transmission scheduler 720 for conducting discovery via the wireless transceiver 121.

Figure 8:
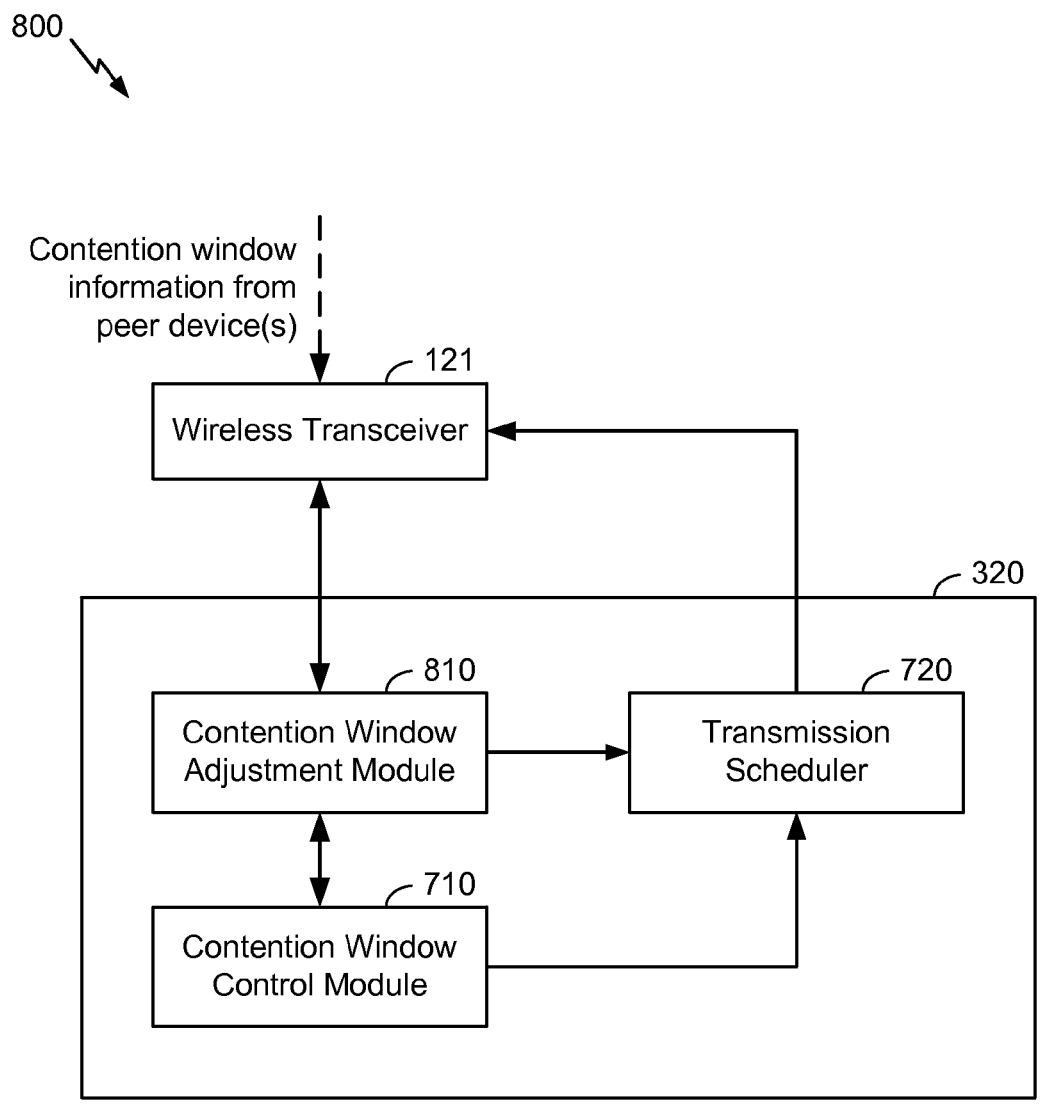
FIG. 8 is a block diagram of a system for adjusting a temporal contention window associated with the timing structure as shown in FIGS. 4-5.

Once set, the contention window size may be static, or it may be adjustable under various circumstances. For instance, system 800 in FIG. 8 shows a timing regulator 320 with a contention window adjustment module 810 operable to adjust a contention window size set by the contention window control module 710. Here, a permissible contention window size range having lower-bound and upper-bound sizes is defined as functions of the collision probability tolerance and an upper-bound discovery time, respectively. As discussed above, the lower bound for the contention window size is 1/p, and this is the initial contention window size used by the contention window control module 710. The upper bound is defined as a function of the upper-bound discovery time as follows. For a given contention window size CW, the maximum potential time for discovery $t_{disc}$, is defined as follows:

$$t_{disc} = n(DIFS+T_{dp}) + \text{slot\_size} \times CW,$$

where n is the number of devices, DIFS is the length of the DIFS interval, and $T_{dp}$ is the time for transmission of one discovery packet. Thus, if the discovery time is to be limited by an upper-bound discovery time, $t_{disc\_ub}$, the following holds:

$$CW < (t_{disc\_ub} - n(DIFS+T_{dp}))/\text{slot\_size}.$$

Here, the upper-bound discovery time $t_{disc\_ub}$ is obtained by the timing regulator 320 in a similar manner to that by which the collision probability tolerance p and/or other parameters are obtained, e.g., as a system-wide parameter, based on user preferences, etc. The contention window adjustment module 810 can alter the size of the contention window used by the timing regulator 320 in any manner suitable for facilitating efficient communication within its associated network, provided that the contention window size utilized does not fall outside of the range given by the upper-bound and lower-bound contention window sizes. If the system parameters used for defining this range, such as p, $t_{disc\_ub}$, or other parameters, are changed, the contention window adjustment module 810 can verify that the present contention window size remains within the resulting new range and adjust the contention window size accordingly if it has moved outside the range.

As the discovery window size may be independently set by different devices within the system, devices may maintain different contention window size parameters, provided that each of these parameters are within a permissible range for the network as described above. To increase collision avoidance functionality, devices within the network can communicate information relating to their contention windows to each other to enable adjustment of the contention windows based on this information. Referring again to the system 800 in FIG. 8, the wireless transceiver 121 obtains contention window information from other devices associated with the system 800. In response to receiving these parameters, the contention window adjustment module 810 determines whether the contention window size is to be adjusted and, if so, the extent to which to perform adjustment. Here, the contention window information transmitted from a device includes an indicator of the size of the contention window of that device, e.g., in units of slots, time units (such as ms), etc. This indicator may be of any length (e.g., 1 byte, etc.) suitable for conveying the corresponding information to other devices within the system. The contention window information may be sent as a standalone transmission and/or bundled or embedded within other transmissions, such as transmissions of discovery packets as described above.

As noted above, each device initially sets its contention window size as a function of the system-wide collision probability tolerance. Thus, each device may in some cases independently set the same initial contention window size. However, in the event that contention window sizes between devices differ, the contention window adjustment module 810 can be utilized to reduce the extent to which the contention windows of each device differ. For instance, if the contention window adjustment module 810 identifies that another device in the system is using a contention window of a different size, the contention window adjustment module 810 may adjust the contention window size upward or downward as appropriate.

Here, the contention window adjustment module 810 is configured to select a largest contention window size from among those identified within the network. Thus, if the contention window adjustment module 810 receives information regarding a device having a larger contention window, the contention window adjustment module 810 replaces its present contention window length with that of the identified device. Alternatively, the contention window adjustment module 810 may adjust the contention window size upward in response to identifying a larger contention window by other measures (e.g., a fixed amount, a random amount, a percentage of the difference between the current and identified window sizes, etc.). If a device having a smaller contention window is identified, the contention window adjustment module 810 would take no action in this case (however, depending on implementation, a downward adjustment could be performed). Subsequently, the contention window adjustment module 810 would facilitate transmission of an indicator of its own contention window size throughout the network to enable devices having shorter contention windows to perform similar adjustments to those described above.

Figure 9:
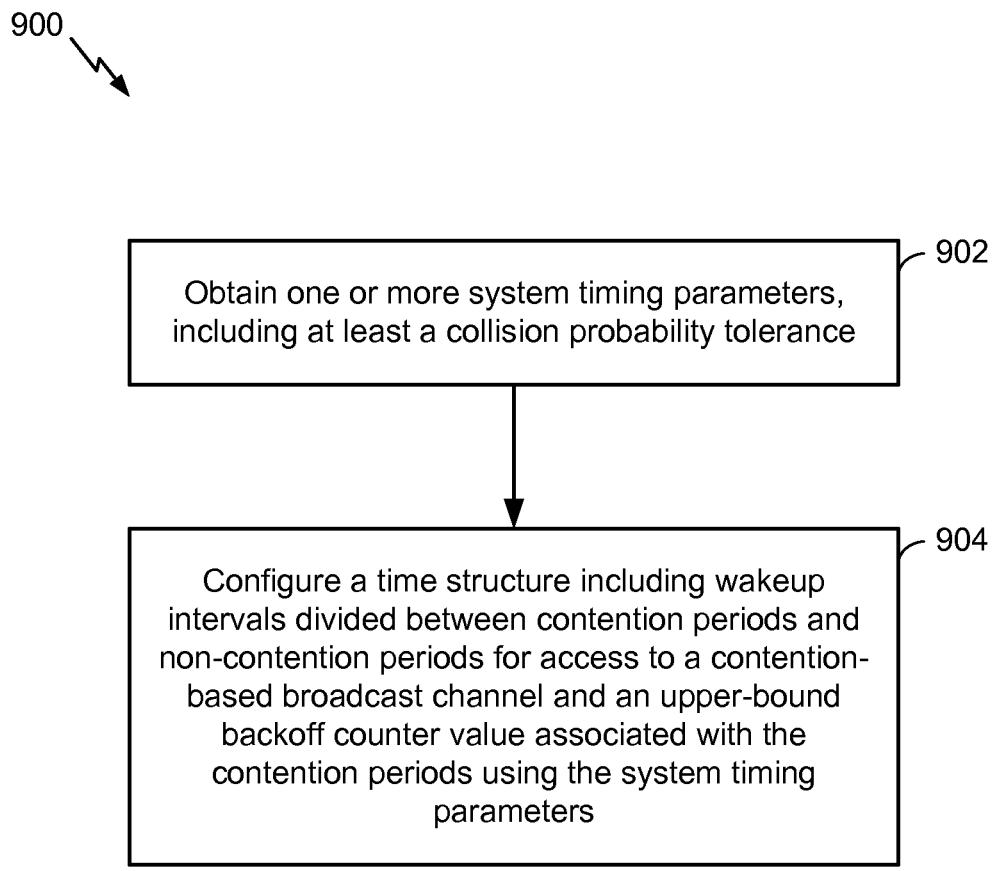
FIG. 9 is a block flow diagram of a process of managing access to a contention-based broadcast channel in a wireless communication network.

Referring to FIG. 9, with further reference to FIGS. 1-8, a process 900 of managing access to a contention-based broadcast channel in a wireless communication network includes the stages shown. The process 900 is, however, an example only and not limiting. The process 900 can be altered, e.g., by having stages added, removed, rearranged, combined, and/or performed concurrently. Still other alterations to the process 900 as shown and described are possible.

At stage 902, one or more system timing parameters (e.g., timing control parameters 322), including at least a collision probability tolerance, are obtained (e.g., by a timing regulator 320). In addition to the collision probability tolerance, the timing parameters may also include an upper-bound discovery time, contention window sizes of other devices in the system, and/or other properties as described above. The parameters may be obtained at stage 902 from preprogrammed or other preset information at a device performing process 900, from other devices in a system, from a server or other management entity (e.g., by connecting to a server on a network other than the P2P network, prior to entry into the P2P network, etc.), and/or by any other suitable means.

At stage 904, a time structure (e.g., the time structure shown by diagram 400) for access to a contention-based broadcast channel is configured using the timing parameters obtained at stage 902. The time structure that includes wakeup intervals (e.g., wakeup intervals 410) divided between contention periods (e.g., discovery periods 420) and non-contention periods (e.g., sleep/data periods 430). In the course of configuring the timing structure at stage 904, an upper-bound backoff counter value associated with the contention periods, e.g., a contention window size, is set (e.g., by a contention window control module 710) as described above. For instance, the upper-bound backoff counter value may be set as a function (e.g., a multiplicative inverse, etc.) of an upper-bound collision probability for the system. Other techniques are also possible. Once set, the timing structure and/or its properties may be modified or adjusted as further discussed above. Further, the timing structure configured at stage 904 can be subsequently utilized by a transmission scheduler 720 and/or other entities associated with a device performing process 900 to schedule discovery packets, traffic packets, and/or other communications to or from the device.

Figure 10:
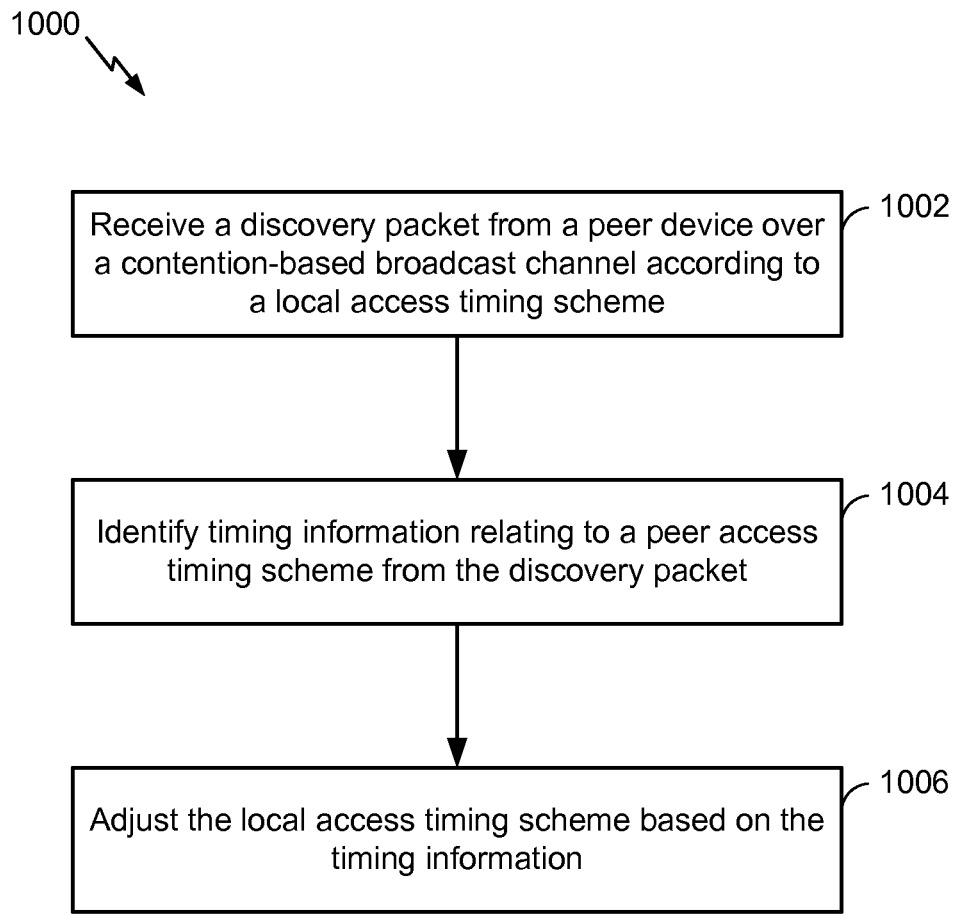
FIG. 10 is a block flow diagram of a process of adjusting a timing scheme that regulates access to a contention-based peer-to-peer wireless network.

Referring to FIG. 10, with further reference to FIGS. 1-8, a process 1000 of adjusting a timing scheme that regulates access to a contention-based peer-to-peer wireless network includes the stages shown. The process 1000 is, however, an example only and not limiting. The process 1000 can be altered, e.g., by having stages added, removed, rearranged, combined, and/or performed concurrently. Still other alterations to the process 1000 as shown and described are possible.

At stage 1002, a discovery packet is received (e.g., via a wireless transceiver 121) from a peer device over a contention-based broadcast channel according to a local access timing scheme configured by a device performing process 1000. Here, the timing scheme is configured in the manner illustrated by process 900 and generally described above. Other techniques for obtaining or generating the timing scheme could also be used. The timing scheme is configured with properties including contention and non-contention period lengths, size of a contention window associated with the contention periods, etc.

At stage 1004, timing information relating to a peer access timing scheme, i.e., a timing scheme utilized by the device from which the discovery packet is received at stage 1002, is identified from the received discovery packet. This information includes, among other possible information, an indicator or other information relating to a contention window size utilized by the originating device of the discovery packet.

At stage 1006, the local access timing scheme is adjusted, e.g., by a contention window control module 710 and/or a contention window adjustment module 810, based on the timing information. Adjustments performed at stage 1006 are conducted in a manner similar to that described above with respect to system 800.

Figure 11:
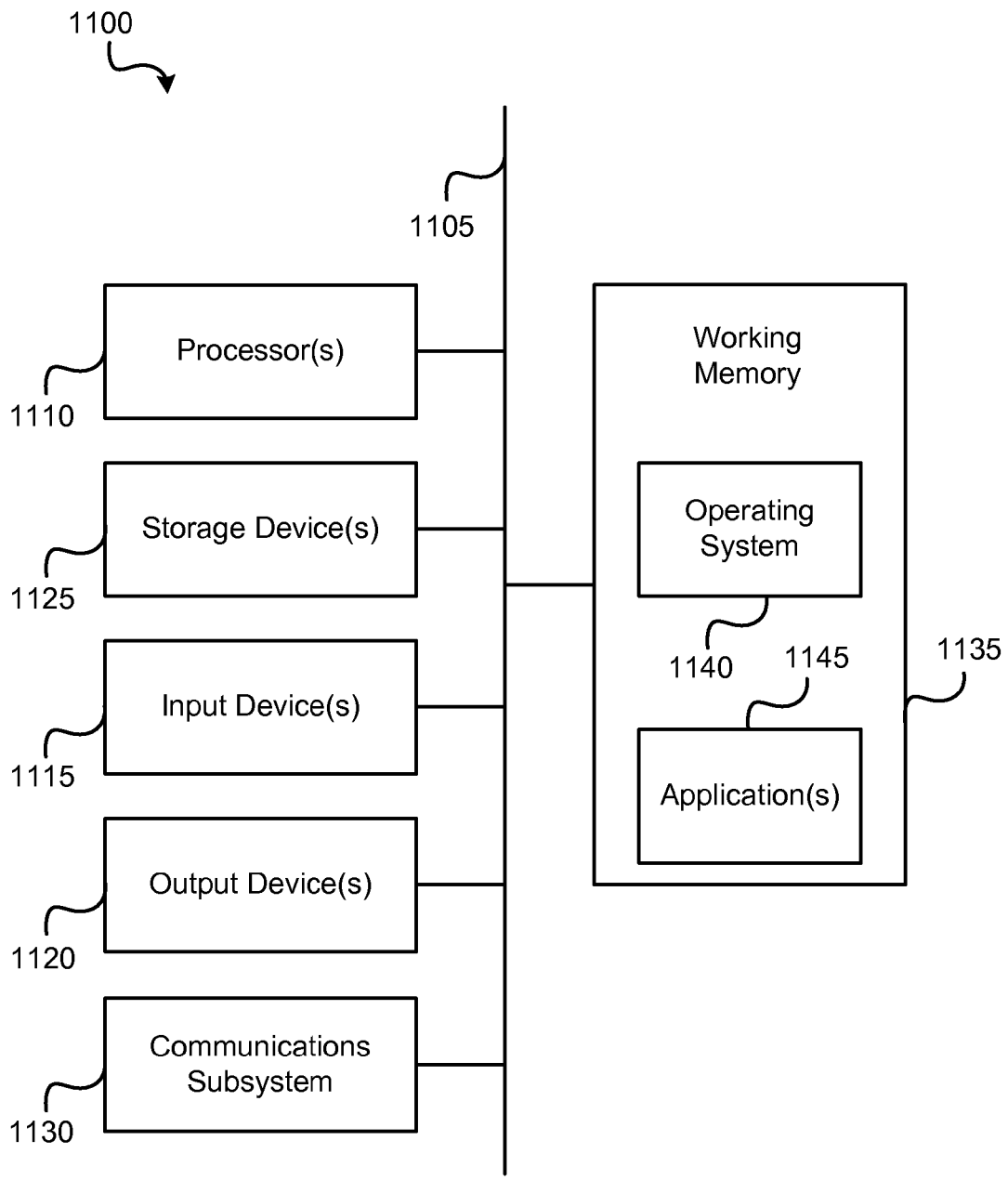
FIG. 11 is a block diagram of an example of a computer system.

A computer system 1100 as illustrated in FIG. 11 may be utilized to at least partially implement the functionality of the previously described computerized devices. FIG. 11 provides a schematic illustration of one embodiment of a computer system 1100 that can perform the methods provided by various other embodiments, as described herein, and/or can function as a mobile device or other computer system. FIG. 11 provides a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a mouse, a keyboard and/or the like; and one or more output devices 1120, which can include without limitation a display device, a printer and/or the like. The processor(s) 1110 can include, for example, intelligent hardware devices, e.g., a central processing unit (CPU), a microcontroller, an ASIC, etc. Other processor types could also be utilized.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise, as here, a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computer system, such as the system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1100) may be used to perform methods in accordance with the disclosure. Some or all of the procedures of such methods may be performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire and fiber optics, including the wires that comprise the bus 1105, as well as the various components of the communication subsystem 1130 (and/or the media by which the communications subsystem 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a storage device 1125 either before or after execution by the processor(s) 1110.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for managing access to a contention-based broadcast channel in a peer-to-peer (P2P) wireless communication network, the method comprising:
   obtaining one or more system timing parameters, the system timing parameters including at least a collision probability tolerance; and
   configuring a time structure for access to the contention-based broadcast channel using the system timing parameters, wherein wakeup intervals are allocated between a contention period and a non-contention period and configuring the time structure comprises setting an upper-bound backoff counter value associated with the contention period as a function of at least the collision probability tolerance.

2. The method of claim 1 further comprising, in response to a current time being in the contention period, entering an active mode to transmit one or more broadcast messages over the contention-based broadcast channel and to attempt to receive one or more broadcast messages over the contention-based broadcast channel.

3. The method of claim 2 wherein entering the active mode comprises:
   transmitting one or more discovery packets (DPs) over the contention-based broadcast channel; and
   attempting to receive one or more DPs over the contention-based broadcast channel.

4. The method of claim 3 further comprising embedding information relating to the time structure in the one or more DPs.

5. The method of claim 1 wherein setting the upper-bound backoff counter value comprises setting the upper-bound backoff counter value as a multiplicative inverse of the collision probability tolerance.

6. The method of claim 1 wherein setting the upper-bound backoff counter value comprises:
   obtaining an upper-bound discovery time associated with the network;
   defining a range for the upper-bound backoff counter value, the range having a lower bound defined by a multiplicative inverse of the collision probability tolerance and an upper bound defined as a function of the upper-bound discovery time; and
   selecting the upper-bound backoff counter value from a set of values falling within the range.

7. The method of claim 1 wherein configuring the time structure comprises configuring a first time structure, and the method further comprises:
   receiving information relating to a second time structure for access to the contention-based broadcast channel utilized by a peer device in the network; and
   adjusting the first time structure based on the information.

8. The method of claim 7 wherein receiving the information comprises receiving an indicator of an upper-bound backoff counter value of the second time structure.

9. The method of claim 8 wherein adjusting the first time structure comprises adjusting the upper-bound backoff counter value of the first time structure if the upper-bound backoff counter value of the first time structure differs from the upper-bound backoff counter value of the second time structure.

10. The method of claim 8 wherein adjusting the first time structure comprises setting the upper-bound backoff counter value of the first time structure to be equal to the upper-bound backoff counter value of the second time structure if the upper-bound backoff counter value of the second time structure is greater than the upper-bound backoff counter value of the first time structure.

11. The method of claim 1 further comprising transmitting information relating to the time structure to one or more peer devices in the network, wherein the information comprises an indicator of the upper-bound backoff counter value.

12. The method of claim 1 further comprising, in response to a current time being in the non-contention period, performing one or more of entering a sleep mode or communicating with one or more peer devices in the network based on broadcast messages received during the contention period.

13. An apparatus for access management in a contention-based peer-to-peer (P2P) wireless communication network, the apparatus comprising:
 a timing regulator configured to obtain one or more system timing parameters, the system timing parameters including at least a collision probability tolerance, and to initialize a time structure for access to the contention-based broadcast channel using the system timing parameters, wherein wakeup intervals are allocated between a contention period and a non-contention period; and
 a contention window control module communicatively coupled to the timing regulator and configured to set an upper-bound backoff counter value associated with the contention period as a function of at least the collision probability tolerance.

14. The apparatus of claim 13 further comprising a transmission scheduler communicatively coupled to the timing regulator and the contention window control module and configured to enter an active mode for transmission or attempted detection of one or more discovery packets (DPs) over the contention-based broadcast channel in response to a current time being in a contention period.

15. The apparatus of claim 14 wherein the transmission scheduler is further configured to embed information relating to the time structure in one or more transmitted DPs.

16. The apparatus of claim 13 wherein the contention window control module is further configured to set the upper-bound backoff counter value as a multiplicative inverse of the collision probability tolerance.

17. The apparatus of claim 13 wherein:
 the timing regulator is further configured to obtain an upper-bound discovery time associated with the network; and
 the contention window control module is further configured to define a range for the upper-bound backoff counter value, the range having a lower bound defined by a multiplicative inverse of the collision probability tolerance and an upper bound defined as a function of the upper-bound discovery time, and to select the upper-bound backoff counter value from a set of values falling within the range.

18. The apparatus of claim 13 wherein:
 the time structure managed by the timing regulator comprises a first time structure,
 the upper-bound backoff counter value set by the contention window control module comprises a first upper-bound backoff counter value, and
 the apparatus further comprises a contention window adjustment module communicatively coupled to the contention window control module and the timing regulator and configured to obtain information relating to a second time structure for access to the contention-based broadcast channel utilized by a peer device in the network and to adjust the first time structure based on the information.

19. The apparatus of claim 18 wherein the information obtained from the peer devices comprises an indicator of a second upper-bound backoff counter value associated with the second time structure.

20. The apparatus of claim 19 wherein the contention window adjustment module is further configured to adjust the first upper-bound backoff counter value if the first upper-bound backoff counter value and second upper-bound backoff counter value differ.

21. The apparatus of claim 19 wherein the contention window adjustment module is further configured to set the first upper-bound backoff counter value to be equal to the second upper-bound backoff counter value if the second upper-bound backoff counter value is greater than the first upper-bound backoff counter value.

22. The apparatus of claim 13 wherein the transmission scheduler is further configured to select, in response to a current time being in the non-contention period, an operation from among entering a sleep mode or communicating with one or more peer devices in the network based on broadcast messages received during the contention period.

23. An apparatus for managing access to a contention-based broadcast channel in a peer-to-peer (P2P) wireless communication network, the apparatus comprising:
 means for obtaining one or more system timing parameters, the system timing parameters including at least a collision probability tolerance;
 means for configuring a time structure for access to the contention-based broadcast channel using the system timing parameters, wherein wakeup intervals are allocated between a contention period and a non-contention period; and
 means for setting an upper-bound backoff counter value associated with the contention period as a function of at least the collision probability tolerance.

24. The apparatus of claim 23 wherein the means for setting the upper-bound backoff counter value comprises means for setting the upper-bound backoff counter value as a multiplicative inverse of the collision probability tolerance.

25. The apparatus of claim 23 wherein:
 the means for obtaining the one or more system timing parameters comprises means for obtaining an upper-bound discovery time associated with the network; and
 the means for setting the upper-bound backoff counter value comprises:
 means for defining a range for the upper-bound backoff counter value, the range having a lower bound defined by a multiplicative inverse of the collision probability tolerance and an upper bound defined as a function of the upper-bound discovery time; and
 means for selecting the upper-bound backoff counter value from a set of values falling within the range.

26. The apparatus of claim 23 wherein the time structure configured via the means for configuring comprises a first time structure, the upper-bound backoff counter value set via the means for setting comprises a first upper-bound backoff counter value, and the apparatus further comprises:
 means for obtaining information relating to a second time structure for access to the contention-based broadcast channel utilized by a peer device in the network, the information comprising an indicator of a second upper-bound backoff counter value associated with the second time structure; and
 means for adjusting the first time structure based on the information.

27. The apparatus of claim 26 wherein the means for adjusting the first time structure comprises means for adjusting the first upper-bound backoff counter value if the first upper-bound backoff counter value and second upper-bound backoff counter value differ.

28. The apparatus of claim 26 wherein the means for adjusting the first time structure comprises means for setting the first upper-bound backoff counter value to be equal to the second upper-bound backoff counter value if the second upper-bound backoff counter value is greater than the first upper-bound backoff counter value.

29. The apparatus of claim 23 further comprising means for transmitting information relating to the time upper-bound backoff counter value to one or more peer devices in the network.

30. A non-transitory computer program product residing on a processor-executable computer storage medium, the computer program product comprising processor-executable instructions configured to cause a processor to:
obtain one or more timing parameters for a wireless communication network, the system timing parameters including at least a collision probability tolerance; and
configure a time structure for access to a contention-based broadcast channel associated with the network using the system timing parameters, wherein wakeup intervals are allocated between a contention period and a non-contention period and configuring the time structure comprises setting an upper-bound backoff counter value associated with the contention period as a function of at least the collision probability tolerance.

31. The non-transitory computer program product of claim 30 wherein the instructions configured to cause the processor to configure the time structure are further configured to cause the processor to set the upper-bound backoff counter value as a multiplicative inverse of the collision probability tolerance.

32. The non-transitory computer program product of claim 30 wherein the instructions configured to cause the processor to set the upper-bound backoff counter value are further configured to cause the processor to:
obtain an upper-bound discovery time associated with the network;
define a range for the upper-bound backoff counter value, the range having a lower bound defined by a multiplicative inverse of the collision probability tolerance and an upper bound defined as a function of the upper-bound discovery time; and
select the upper-bound backoff counter value from a set of values falling within the range.

33. The non-transitory computer program product of claim 30 wherein the time structure configured by the processor comprises a first time structure and the instructions are further configured to cause the processor to:
receive information relating to a second time structure for access to the contention-based broadcast channel utilized by a peer device in the network, the information comprising an indicator of an upper-bound backoff counter value of the second time structure; and
adjust the first time structure based on the information.

34. The non-transitory computer program product of claim 33 wherein the instructions configured to cause the processor to adjust the first time structure are further configured to cause the processor to adjust the upper-bound backoff counter value of the first time structure if the upper-bound backoff counter value of the first time structure differs from the upper-bound backoff counter value of the second time structure.

35. The non-transitory computer program product of claim 33 wherein the instructions configured to cause the processor to adjust the first time structure are further configured to cause the processor to set the upper-bound backoff counter value of the first time structure to be equal to the upper-bound backoff counter value of the second time structure if the upper-bound backoff counter value of the second time structure is greater than the upper-bound backoff counter value of the first time structure.

36. The non-transitory computer program product of claim 30 wherein the instructions are further configured to cause the processor to transmit information relating to the time structure to one or more peer devices in the network, wherein the information comprises an indicator of the upper-bound backoff counter value.

* * * * *